May 19, 1931.  R. AMBRONN  1,805,900
METHOD OF EXPLORING THE SUBSOIL
Filed Nov. 12, 1929    2 Sheets-Sheet 1
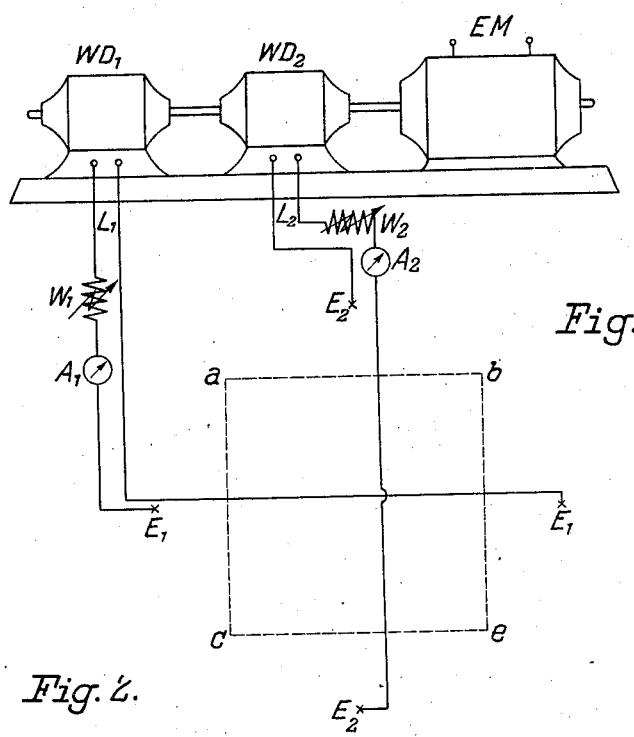
Fig.1.
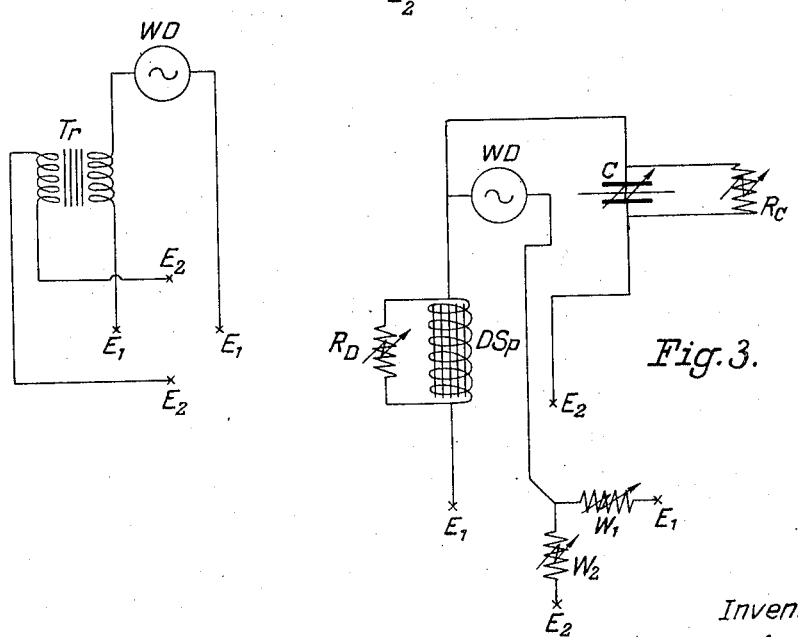
Fig.2.
Fig.3.
Inventor:
Richard Ambronn,
By Byrnes Townsend & Brickenstein,
Attorneys.

May 19, 1931.  R. AMBRONN  1,805,900
METHOD OF EXPLORING THE SUBSOIL
Filed Nov. 12, 1929  2 Sheets-Sheet 2
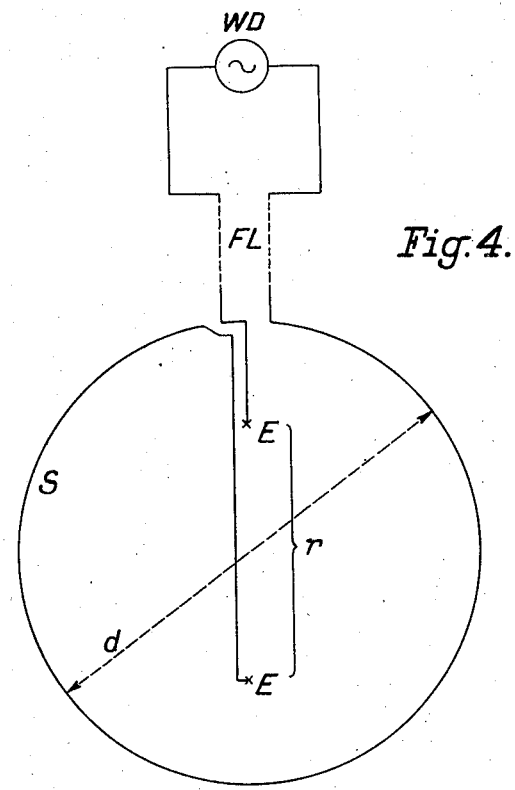
Fig. 4.
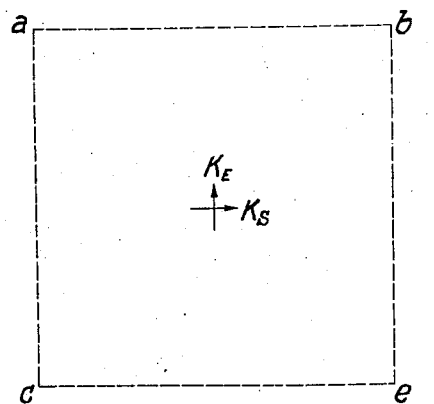
Inventor:
Richard Ambronn,
By Byrnes Townsend & Pickenstein,
Attorneys.

Patented May 19, 1931

1,805,900

UNITED STATES PATENT OFFICE

RICHARD AMBRONN, OF GOTTINGEN, GERMANY

METHOD OF EXPLORING THE SUBSOIL

Application filed November 12, 1929, Serial No. 406,677, and in Germany December 5, 1928.

In the exploration of the subsoil for the purpose of determining the local distribution of electric conductivity therein one has to do with elliptically polarized electro-magnetic fields produced in the subsoil by feeding the ground with alternating current. With respect to the elliptically polarized electro-magnetic fields it has been found that the experimental analysis thereof can be carried through with the more accuracy the more the form of the oscillation ellipses approaches that of a circle.

Considering this fact according to this invention care is taken to feed the ground with alternating current in such manner that the electro-magnetic field produced therein with respect to the oscillation ellipses widely fulfills the above mentioned condition. For this purpose, according to this invention, at least two current systems of like frequency and with phase displaced with respect to each other are excited in the ground. By suitable correlation of such current systems within the field of investigation it is possible to make the polarized electrical current field produced thereby in more or less approximation circular.

For further explanation of the invention it is referred to the accompanying drawings which diagrammatically illustrate several methods of feeding the ground with alternating current and of means allowing to control the currents in a manner adapted to secure the effect aimed at.

Figure 1 shows an arrangement with two alternating current machines.

Figures 2 to 4 show three different methods of producing phase displaced current systems of like frequency and co-operating together from a single alternating current source.

In Figure 1 EM indicates a driving motor for two single phase alternating current machines $WD_1$ and $WD_2$, rigidly coupled together, which have equal numbers of poles and consequently supply an alternating current of like frequency and constant phase difference with respect to each other.

The alternating currents so produced, regulated with respect to their intensity, for example, by means of the resistances $W_1$ and $W_2$, are carried over the lines $L_1$ and $L_2$ to the pairs of electrodes $E_1\ E_1$ or $E_2\ E_2$ which are sunk into the ground in an arrangement with regard to space corresponding to the problem at the moment. The currents carried to the ground through the two pairs of electrodes may be supervised by means of the ammeters $A_1$ and $A_2$.

If as assumed in Figure 1 the electrodes are arranged in the corners of a square and the alternating currents supplied thereby to the earth at a phase difference of 90° are made equal, then with inter alia approximately homogeneous subsoils within the square field $a\ b\ c\ e$ shown by broken lines, a preferably circular polarization condition of the electro-magnetic field of the earth currents would be obtained.

By regulating the current strengths of the two part currents and/or their relative phase difference, any other desired polarization condition of the electro-magnetic field of the earth currents in the pre-selected field of investigation could be produced.

Instead of supplying the currents delivered from the two phase displaced, like frequency alternating current sources through field electrodes, that is, through galvanic coupling, to the earth, the current excitation in the subsoil could be effected by inductional means with suitable position arrangement of the induction coils, or, what would however in practice have but small importance, by capacity means, with suitable position arrangement of the aerials. Also instead of two separate alternating current machines one machine may be used which permits of two alternating of like frequency being taken off.

The supply of each of two or more different alternating currents of like frequency and with adjustable phase displacements from individual alternating current generators involves a certain complication of the method described. This complication is avoided by the arrangements illustrated in Figures 2 to 4, whereby all the phase displaced current systems of like frequency and co-operating together are produced from a single alternating current source with a purely sine shaped potential curve.

Thus, in Figure 2 WD indicates the source of alternating current. From the terminals of this alternating current source a double conductor first leads to a pair of electrodes $E_1 E_1$. In one branch of this line is also connected the primary winding of a transformer $Tr$ to the secondary winding of which are connected the electrode pair $E_2 E_2$. Other apparatus not here shown serve in known manner to regulate the current strength of the currents displaced in phase with respect to each other, and carried through the two pairs of electrodes to the earth, and to supervise the same.

Of course the primary winding of the transformer $Tr$ could just as well be connected in shunt to the electrode pair $E_1 E_1$. The position arrangement of the pairs of electrodes with respect to each other will in each case have to be arranged to suit the external conditions of the problem to be solved.

Another arrangement which at the same time permits of a regulation of the phase difference between the two separate current systems and thus permits in principle also systems of more than two currents phase-displaced with respect to each other to be excited in the subsoil, is shown by Figure 3.

Here WD indicates the alternating current machine supplying the ground currents, $DS_p$ is a choking coil, $R_D$ is an adjustable resistance free of induction and capacity connected in parallel to this choking coil, C is a condenser with adjustable capacity, $R_c$ is a resistance free of induction and capacity, and adjustable, which is connected in parallel to this condenser, $W_1$ and $W_2$ are adjustable resistances to equalize the current strengths between the two pairs of electrodes.

The method of operation of this circuit arrangement is obvious from the figure without further explanation.

Of course with all the arrangements according to Figures 1 to 3, the pairs of electrodes which excite the current by galvanic coupling in the ground, may be replaced by coils or aerial systems which are arranged in positions suitable for the solution of the problem at the moment and which convey the electro-magnetic energy to the ground by inductive or capacitative means. These things are obvious to an expert and need no further illustration.

On the other hand, attention might be called, with reference to Figure 4, to a method differing more widely for the production of two current systems displaced in phase with respect to each other, in the subsoil, and as an example, which on account of its technical simplicity is often of great advantage for use in practice.

In Figure 4 WD again indicates the alternating current machine producing the earth current. EE are two field electrodes which for example may consist of two plates buried in the soil. S is a large surface wire coil insulated from earth. The distance of the field electrodes from each other amounting to $r$ meters, the diameter of the cable loop shaped for example circularly, amounts to $d$ meters.

If now the alternating current machine is connected at one pole to one field electrode, and if the other pole is carried through the otherwise insulated cable loop to the other field electrode, then a flow will be produced in the ground through the field electrodes of like phase to the current in the cable loop S. The geometrical arrangement of the electrodes and of the cable loops may be, for example, as shown in Figure 4. There is then produced in the extension of the electrode connecting line EE in an approximately lineal current ellipse the larger axis of which runs in the direction EE. On the other hand, by means of the magnet field of the loop S there is produced a field also approximately lineal in each point, the main current direction of which lies circularly about the centre point of the sending loop. Within a field $a\,b\,c\,e$ as is shown in Figure 4, the main current directions $K_E$ and $K_s$ of the current components, each nearly straight, produced through the field electrodes or through the sender loop will therefore stand in close approximation to perpendicular to each other. As furthermore in consequence of the nature of their production they show a phase difference of about 90° with respect to each other, we therefore obtain by superposing these two current flows, an elliptic rotating field. If care be taken by a suitable selection of $r$ and $d$ that the two components $K_E$ and $K_s$ have like or nearly equal amplitudes, then approximately circular polarized electromagnetic fields are also obtained in the area investigated.

Generally, however, by means of regulating the dimensions $r$ and $d$ any desired polarization may be adjusted in the area of observation $a\,b\,c\,e$. Besides the regulation of $r$ and $d$, a regulation effected by means of a shunt circuit or other means known in themselves of the current strength ratio between the electrodes EE and in the sending loop S may be used to influence the polarization condition of the electro-magnetic field of the earth currents.

What I claim is:

1. Method of exploration of the subsoil comprising feeding it with alternating current under control of the form of oscillation ellipses of the field produced thereby and measuring the field of the ground currents.

2. Method of exploration of the subsoil comprising exciting within the ground at least two alternating current systems of like frequency of which the phases are displaced with respect to each other by an adjustable time constant and measuring the field of the ground current.

3. Method of exploration of the subsoil comprising feeding it with current produced by an alternating current machine and superimposing on the field produced thereby within the ground a further current system of like frequency and of which the phase is displaced with respect to that of the first mentioned current, and measuring the resulting field of the ground.

4. Method of exploration of the subsoil comprising feeding it with current produced by an alternating current machine, deriving from the current produced by said alternating current machine a phase-displaced current and feeding it likewise to the ground so as to superimpose the fields produced thereby and measuring the field resulting from such superimposition.

5. Method of exploration of the subsoil comprising feeding it by galvanic means with current produced by an alternating current machine, superimposing on the field produced thereby within the ground a further field by inductive means, said further field being produced by a coil member forming part of the current conductor of said alternating current machine.

In testimony whereof, I affix my signature.

RICHARD AMBRONN.